(12) United States Patent
Hui et al.

(10) Patent No.: US 9,304,360 B2
(45) Date of Patent: Apr. 5, 2016

(54) LIQUID CRYSTAL PANEL AND DISPLAY DEVICE

(71) Applicants: HEFEI BOE OPTOELECTRONICS TECHNOLOGY CO., LTD., Hefei, Anhui (CN); BOE TECHNOLOGY GROUP CO., LTD., Beijing (CN)

(72) Inventors: Dasheng Hui, Beijing (CN); Yongjun Yoon, Beijing (CN); Zhizhong Tu, Beijing (CN); Ying Shen, Beijing (CN); Lei Guo, Beijing (CN)

(73) Assignees: HEFEI BOE OPTOELECTRONICS TECHNOLOGY CO., LTD., Hefei, Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 74 days.

(21) Appl. No.: 14/348,694

(22) PCT Filed: Apr. 22, 2013

(86) PCT No.: PCT/CN2013/074490
§ 371 (c)(1),
(2) Date: Mar. 31, 2014

(87) PCT Pub. No.: WO2014/124573
PCT Pub. Date: Aug. 21, 2014

(65) Prior Publication Data
US 2015/0253600 A1 Sep. 10, 2015

(30) Foreign Application Priority Data
Feb. 18, 2013 (CN) .......................... 2013 1 0052696

(51) Int. Cl.
*G02F 1/1339* (2006.01)
*G02F 1/1362* (2006.01)
*G02F 1/1368* (2006.01)

(52) U.S. Cl.
CPC ............ *G02F 1/1339* (2013.01); *G02F 1/1368* (2013.01); *G02F 1/13394* (2013.01); *G02F 1/136277* (2013.01); *G02F 2201/503* (2013.01)

(58) Field of Classification Search
CPC .................................................... G02F 1/1339
See application file for complete search history.

(56) References Cited

U.S. PATENT DOCUMENTS

2005/0088606 A1* 4/2005 Ashizawa et al. ............. 349/156
2007/0216847 A1 9/2007 Chang et al.
(Continued)

FOREIGN PATENT DOCUMENTS

CN 101706630 A 5/2010
JP 2002350861 A 12/2002

OTHER PUBLICATIONS

Written Opinion of the International Searching Authority Dated Nov. 18, 2014; PCT/CN2013/074490.
(Continued)

*Primary Examiner* — Timothy L Rude
(74) *Attorney, Agent, or Firm* — Ladas & Parry LLP

(57) ABSTRACT

Embodiments of the invention provide a liquid crystal panel and a display device. The liquid crystal panel includes an array substrate, an opposite substrate and a liquid crystal layer provided between the array substrate and the opposite substrate. Spacers are arranged on the opposite substrate, pad are arranged on the array substrate, and each of the spacers corresponds to a plurality of pads and has different contact areas with the plurality of pads.

16 Claims, 4 Drawing Sheets

(56) References Cited

U.S. PATENT DOCUMENTS

| | | | |
|---|---|---|---|
| 2008/0123043 A1* | 5/2008 | Li et al. | 349/156 |
| 2009/0115954 A1* | 5/2009 | Tseng et al. | 349/156 |
| 2009/0180043 A1* | 7/2009 | Rho et al. | 349/12 |
| 2010/0165278 A1* | 7/2010 | Matsumori et al. | 349/123 |
| 2012/0086901 A1* | 4/2012 | Nakagawa et al. | 349/155 |
| 2014/0028954 A1* | 1/2014 | Shibazaki | 349/64 |
| 2015/0098041 A1* | 4/2015 | Jung et al. | 349/46 |

OTHER PUBLICATIONS

First Chinese Office Action Appln. No. 201310052696:8; Dated Nov. 3, 2014.

* cited by examiner

US 9,304,360 B2

LIQUID CRYSTAL PANEL AND DISPLAY DEVICE

TECHNICAL FIELD

Embodiments of the invention relate to a liquid crystal panel and a display device.

BACKGROUND

As shown in FIG. 1, a conventional liquid crystal display device comprises an opposite substrate 101 and an array substrate 102 which are bonded together by a sealant 103 to form a liquid crystal cell, and a liquid crystal 104 is filled in the liquid crystal cell. Spacers are generally formed on the opposite substrate 101 and are used for keeping a gap of the liquid crystal cell.

Generally, the spacers comprise a main spacer 106 and an auxiliary spacer 107. After the opposite substrate 101 and the array substrate 102 are bonded together, the main spacer 106 contact with a pad 105 provided on the array substrate 102. The auxiliary spacer 107 is used as a spare spacer, and assists the main spacer 106 to keep the gap of the liquid crystal cell when the liquid crystal display device is pressed by a strong force.

In a unit area, a contact density between the main spacer 106 and the array substrate 102 is a quite important parameter, particularly for an IPS (In Plane Switch) mode liquid crystal display device which is more sensitive to Mura defect (Mura defect is an image quality defect caused by uneven brightness). Too high or too low contact density will bring about negative impact on LC Margin (LC Margin is a liquid crystal amount range where the liquid crystal screen is free from gravity Mura at high temperature and free from bubbles at low temperature) and on image quality.

In the case that contact density between the spacers on the opposite substrate and the pads on the array substrate is too low, the support strength of the spacers is insufficient at high temperature so that the liquid crystal is gathered on the lower side of the liquid crystal screen under gravity and a gravity Mura occurs, as shown in FIG. 2. In the case that the contact density between the spacers and the pads is too high, the liquid crystal shrinks and liquid crystal volume is reduced at low temperature but the cell gap is not correspondingly reduced due to too high support strength of the spacers, so that bubbles appear on the corners of the liquid crystal screen, as shown in FIG. 3.

SUMMARY OF THE INVENTION

According to one embodiment of the invention, there is provided a liquid crystal panel. The liquid crystal panel comprises an array substrate, an opposite substrate and a liquid crystal layer provided between the array substrate and the opposite substrate. Spacers are arranged on the opposite substrate, pads are arranged on the array substrate, and each of the spacers corresponds to a plurality of pads and has different contact areas with the plurality of pads.

According to another embodiment of the invention, there is provided a display device. The display device comprises the liquid crystal panel described above.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

First Embodiment

The embodiment provides a liquid crystal panel. The liquid crystal panel comprises an array substrate, an opposite substrate and a liquid crystal layer provided between the array substrate and the opposite substrate. Spacers are arranged on the opposite substrate and pads are arranged on the array substrate. Each of the spacers corresponds to a plurality of pads and has different contact areas with the plurality of pads. Different contact areas can be achieved by enabling the spacers to contact with different pads, thus the contact density between the spacers and the pads can be changed.

Figure 1:
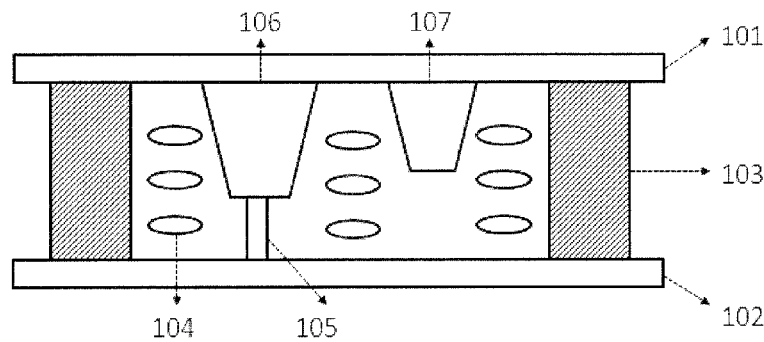
FIG. 1 is a structural schematic view illustrating a conventional liquid crystal panel.
Figure 2:
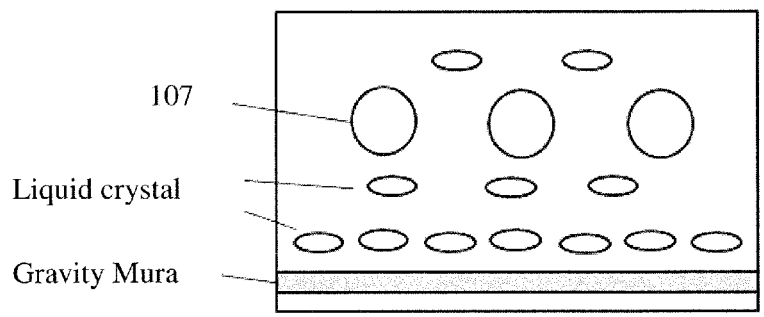
FIG. 2 is a schematic view illustrating a defect in the liquid crystal panel in the case that the contact density between the spacers and the pads in the conventional liquid crystal panel is too low.
Figure 3:
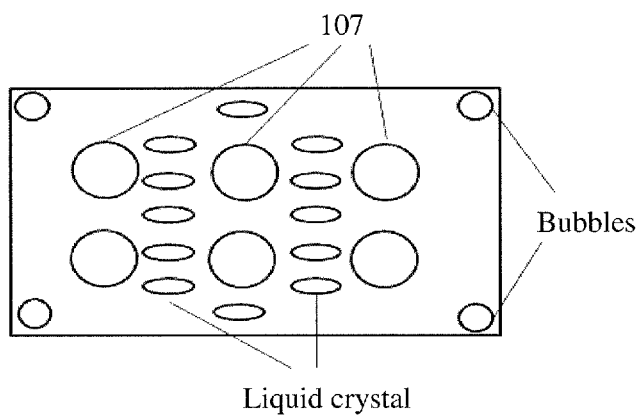
FIG. 3 is a schematic view illustrating another defect in the liquid crystal panel in the case that the contact density between the spacers and the pads in the conventional liquid crystal panel is too high.
Figure 4:
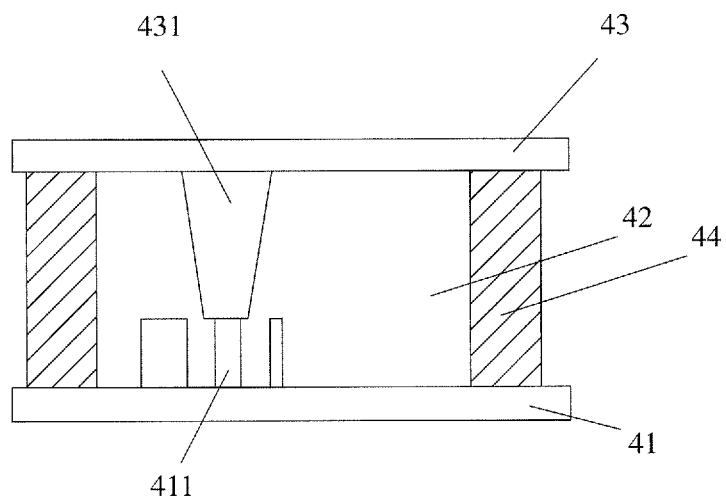
FIG. 4 is a structural schematic view illustrating a liquid crystal panel according to an embodiment of the invention.
Figure 5:
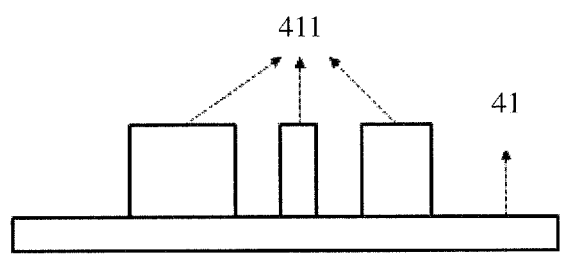
FIG. 5 is a structural schematic view illustrating pads according to an embodiment of the invention.

The liquid crystal panel according to the embodiment will be described in detail in conjunction with FIG. 4 and FIG. 5. As shown in FIG. 4, the liquid crystal panel according to the embodiment comprises the array substrate 41 and the opposite substrate 43. The array substrate 41 and the opposite substrate 43 are bonded together by a sealant 44 to form a liquid crystal cell. The liquid crystal cell is filled with the liquid crystal layer 42.

The liquid crystal panel further comprises spacers 431 arranged on the opposite substrate 43 and pads 411 arranged on the array substrate 41. After the array substrate 41 and the opposite substrate 43 are bonded with each other to form the liquid crystal cell, the spacers 431 abut upon the pads 411 to keep the gap of the liquid crystal cell.

One of the spacers 431 corresponds to a plurality of pads 411. For example, as shown in FIG. 4, one spacer 431 corresponds to three pads 411.

As shown in FIG. 4, the plurality of pads 411 have cross-sectional areas different one another, and the cross-sectional area of each of the plurality of pads 411 is smaller than a top area of the spacer 431 that the plurality of pads 411 correspond to. Here, the cross-sectional area of the pad 411 refers to an area of a surface of the pad 411 in contact with the spacer 431, and the top area of the spacer 431 refers to an area of a surface of the spacer 431 in contact with the pad 411. Therefore, each spacer has different contact areas with the plurality of pads that this spacer corresponds to.

For example, the pads 411 are of cylindrical shape. For example, the pads are provided in an upper layer of a gate electrode layer of the array substrate. For example, the pads are provided in a same layer as an active layer, and are made of a same material as the active layer, such as a-Si or oxide semiconductor material.

For example, a distance between adjacent pads 411 can be adjusted according to product parameters and a displacement distance of a pad mask plate.

For example, the contact density between the spacers and the pads can be changed through a spacer mask plate displacement process or a spacer mask plate reversal process without changing the structure of the spacer mask plate.

Figure 6A:
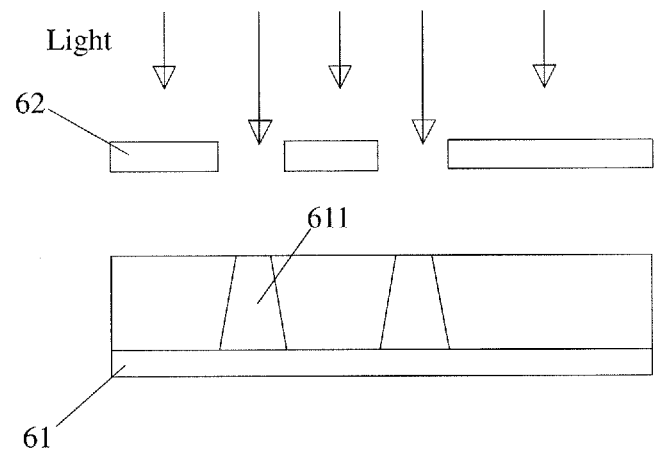
FIG. 6a-FIG. 6b are schematic views illustrating a spacer mask plate displacement process according to an embodiment of the invention.
Figure 6B:
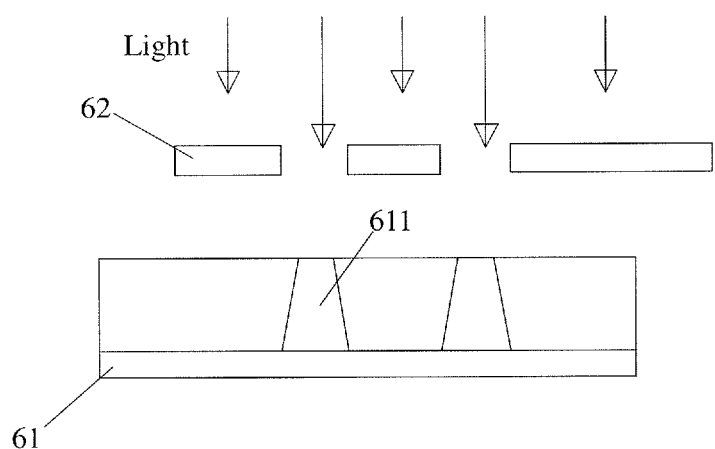

FIG. 6a-FIG. 6b are schematic views illustrating the spacer mask plate displacement process. In the case that it is difficult to acquire a desired contact density when the spacer is in contact with one corresponding pad, a displacement of the spacer 611 is achieved by displacing the spacer mask plate 62 by a desired distance and then performing a patterning process, so that the spacer 611 comes into contact with another corresponding pad to achieve the desired contact density.

Figure 7A:
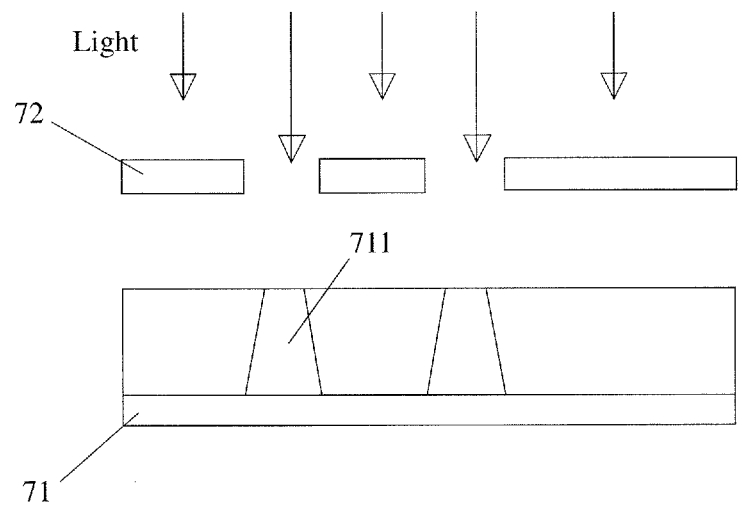
FIG. 7a-FIG. 7b are schematic views illustrating a spacer mask plate reversal process according to an embodiment of the invention
Figure 7B:
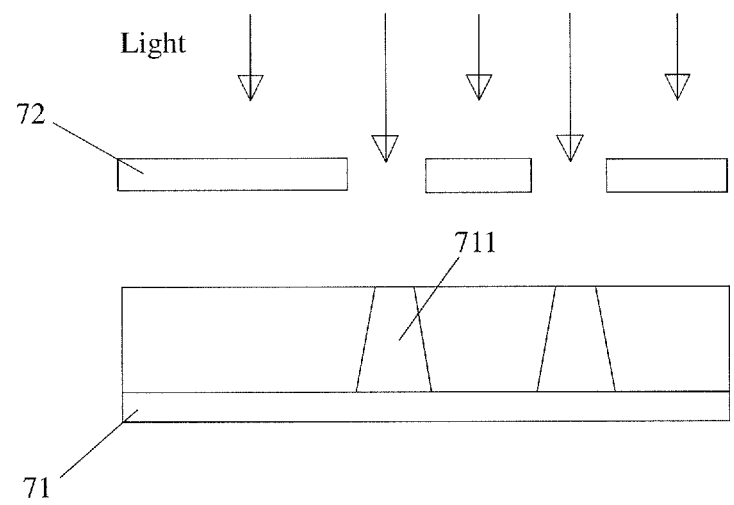

FIG. 7a-FIG. 7b are schematic views illustrating the spacer mask plate reversal process. In the case that it is difficult to acquire a desired contact density when the spacer is in contact with one corresponding pad, a displacement of the spacer 711 is achieved by reversing the spacer mask plate 72 by 180 degree and then performing a patterning process, so that the spacer 711 comes into contact with another corresponding pad to achieve the desired contact density.

For example, the array substrate may be manufactured with a normal process.

In the embodiment, the contact density between the spacers and the pads can be changed without changing the structure of the spacer mask plate, which not only can save expense on the spacer mask plate, but also can greatly reduce the influence of the change of the spacer mask plate on the manufacture period.

Although it is described in the embodiment that the spacers are formed on the opposite substrate and the pads are formed on the array substrate, the embodiment of the invention is not limited thereto. For example, the spacers may be formed on the array substrate whereas the pads may be formed on the opposite substrate.

Although it is described in the embodiment that there are provided three pads, the embodiment of the invention is not limited thereto. For example, there may be two or more than three pads.

Although it is described in the embodiment that the pads are of cylindrical shape, the embodiment of the invention is not limited thereto. For example, the pads may be of cuboid shape or of column shape in any other forms.

Although FIG. 4 only illustrates one spacer, the embodiment of the invention is not limited thereto. For example, a plurality of spacers may be provided.

Second Embodiment

The embodiment provides a display device. The display device comprises the liquid crystal panel described above.

For example, the display device may be a liquid crystal panel, an electronic paper, an OLED (Organic Light Emitting Diode) panel, a liquid crystal TV, a liquid crystal display, a digital photo frame, a mobile phone, a tablet computer, or any other products or components having display function.

The foregoing embodiments merely are exemplary embodiments of the invention, and not intended to define the scope of the invention, and the scope of the invention is determined by the appended claims.

What is claimed is:

1. A liquid crystal panel, comprising an array substrate, an opposite substrate and a liquid crystal layer provided between the array substrate and the opposite substrate,
wherein spacers are arranged on the opposite substrate, pads are arranged on the array substrate, and each of the spacers corresponds to a plurality of pads and has different contact areas with the plurality of pads, and
wherein the contact area between each of the spacers and the plurality of pads is changed by selecting each of the spacers to only contact one of the plurality of pads.

2. The liquid crystal panel according to claim 1, wherein each of the plurality of pads have cross-sectional areas different from one another, and the cross-sectional area of each of the plurality of pads is smaller than a top area of the spacer that the plurality of pads correspond to.

3. The liquid crystal panel according to claim 1, wherein each of the spacers corresponds to at least two pads.

4. The liquid crystal panel according to claim 1, wherein the pads are provided in an upper layer of a gate electrode layer of the array substrate.

5. The liquid crystal panel according to claim 4, wherein the pads are provided in a same layer as an active layer of the array substrate.

6. The liquid crystal panel according to claim 5, wherein the pads are made of a same material as the active layer.

7. The liquid crystal panel according to claim 1, wherein the pads are of column shape.

8. The liquid crystal panel according to claim 1, wherein the array substrate and the opposite substrate are bonded together by a sealant.

9. A display device, comprising the liquid crystal panel according to claim 1.

10. The display device according to claim 9, wherein the plurality of pads have cross-sectional areas different one another, and the cross-sectional area of each of the plurality of pads is smaller than a top area of the spacer that the plurality of pads correspond to.

11. The display device according to claim 9, wherein each of the spacers corresponds to at least two pads.

12. The display device according to claim 9, wherein the pads are provided in an upper layer of a gate electrode layer of the array substrate.

13. The display device according to claim 12, wherein the pads are provided in a same layer as an active layer of the array substrate.

14. The display device according to claim 13, wherein the pads are made of a same material as the active layer.

15. The display device according to claim 9, wherein the pads are of column shape.

16. The display device according to claim 9, wherein the array substrate and the opposite substrate are bonded together by a sealant.

* * * * *